United States Patent [19]

Henn

[11] Patent Number: 5,046,409

[45] Date of Patent: Sep. 10, 1991

[54] MACHINE FOR BREWING HOT BEVERAGES

[75] Inventor: Stefan Henn, Solingen, Fed. Rep. of Germany

[73] Assignee: Robert Krups Stiftung & Co. KG., Solingen, Fed. Rep. of Germany

[21] Appl. No.: 394,749

[22] Filed: Aug. 16, 1989

[30] Foreign Application Priority Data

Aug. 31, 1988 [DE] Fed. Rep. of Germany ....... 3829417

[51] Int. Cl.[5] ............................................ A47J 31/12
[52] U.S. Cl. ..................................... 99/307; 99/285; 99/317
[58] Field of Search ................. 99/307, 313, 314, 316, 99/317, 304, 302 R, 306, 315, 323, 285; 426/433

[56] References Cited

U.S. PATENT DOCUMENTS 1,803,232 4/1931 Carozzi ................................ 99/313
1,843,241 2/1932 Pouget .................................. 99/314

Primary Examiner—Robert W. Jenkins
Attorney, Agent, or Firm—Peter K. Kontler

[57] ABSTRACT

An electric coffee or tea making machine wherein the housing resembles a carafe and has an annular outer chamber for hot beverage and a centrally located chamber for a body of water. The centrally located chamber is located above a heating unit, such as a standard electric resistance heater, a halogen lamp or a heater with one or more thick film conductors, and the heated liquid flows upwardly through a riser to be distributed over a supply of comminuted coffee beans or tea leaves in a removable filtering unit which has an outlet for admission of freshly brewed coffee or tea into the outer chamber. A cover above the filtering unit is threadedly connected to the upper end of the housing to ensure that the interior of the housing can be maintained well above atmospheric pressure without risking escape of hot water or steam. The device for uniformly distributing heated water in the filtering unit can constitute a nozzle or a foraminous top wall above the supply of flavoring agent.

45 Claims, 6 Drawing Sheets

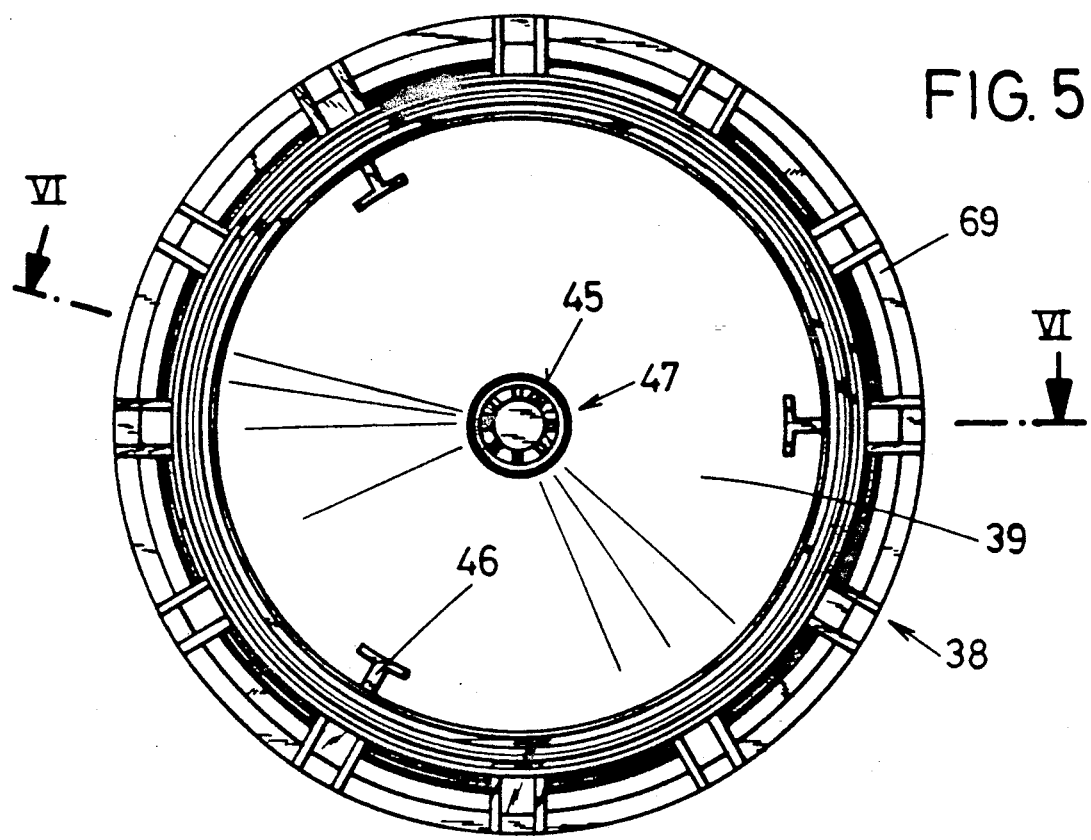
FIG. 5
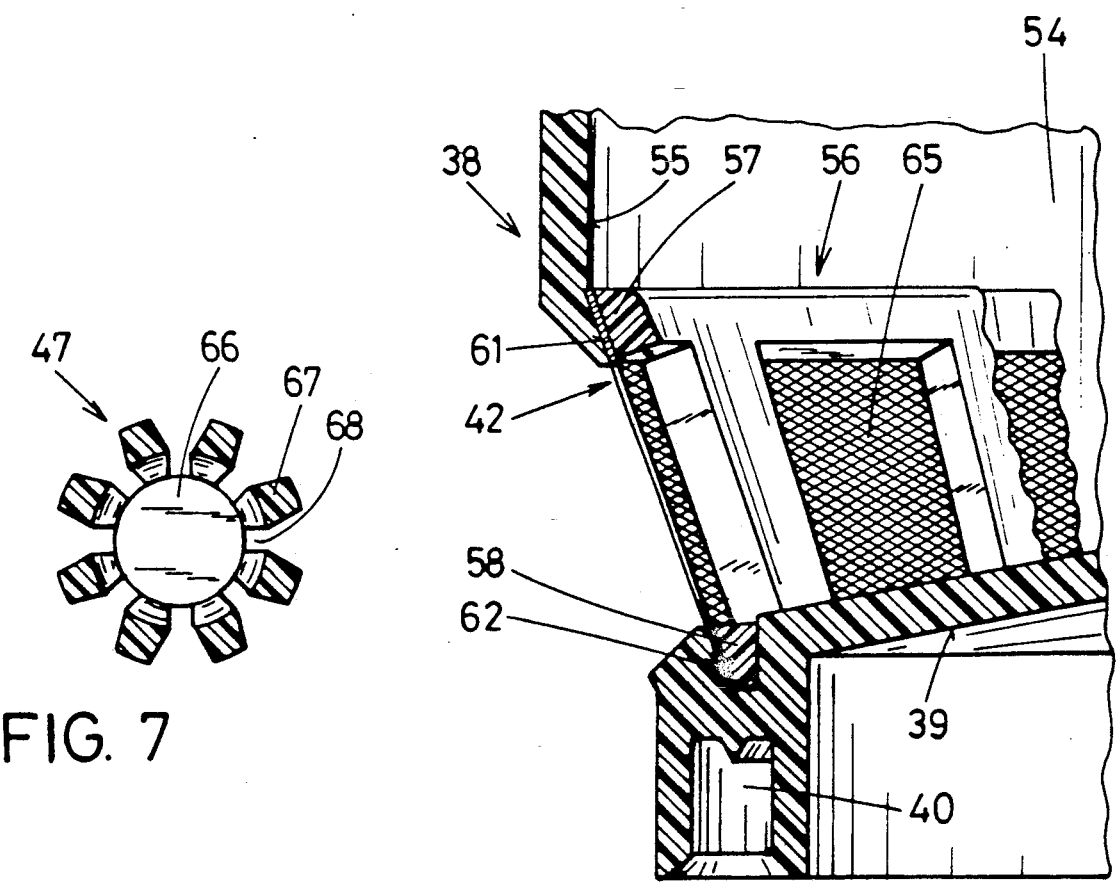
FIG. 7
FIG. 8

MACHINE FOR BREWING HOT BEVERAGES

BACKGROUND OF THE INVENTION

The invention relates to machines for making hot beverages, such as coffee, tea or chocolate. More particularly, the invention relates to improvements in coffee-, tea- or analogous brewing machines of the type wherein the housing resembles or constitutes a carafe with a chamber for the liquid (such as water or milk) to be heated and with a chamber for freshly brewed beverage.

German Utility Model No. 71 34 272 discloses a coffee making machine wherein the housing resembles a carafe and wherein an electric heater serves to heat a body of water. Heated water flows upwardly through a riser and contacts a supply of comminuted coffee beans. The thus obtained beverage gathers in a chamber having a dispensing spout to facilitate pouring of the beverage into cups or other receptacles. The electric heater is a so-called immersion heater which dips into the body of water in the respective chamber of the housing. The beverage-receiving chamber is disposed beneath a coffee filter. A cup-shaped container for boiling water is removably inserted into the top portion of the housing and receives hot water from the water-containing chamber by way of the overflow type outlet of the aforementioned riser. A fluidtight seal is provided between the container and the upper end of the water-receiving chamber. The container comprises a partition which divides its interior into two compartments and enables hot liquid to overflow from one compartment into the other. A water-discharging outlet of the container is located at a level above the filter to furnish a stream of hot water which penetrates through the supply of comminuted coffee beans on the filter and into the beverage-receiving chamber below. The outlet of the container communicates with both compartments and is designed in such a way that the rate of outflow of hot water from one of the compartments can exceed the rate of outflow from the other compartment. A plug-type cover or bung is used to close the upper end of the housing above the container.

The just described machine is operated as follows: The filter receives a supply of communicated coffee beans, and the container is placed on top of the water-receiving chamber prior to insertion of the cover. The immersion-type heating element is set in operation to heat the body of water in the respective chamber. When the temperature of heated water reaches a predetermined value, the pressure of developing vapors forces hot water to flow upwardly through the riser and into the container wherein one of the compartments is filled ahead of the other. The outlet of the container discharges hot water onto the supply of comminuted coffee beans on the filter, and the thus obtained beverage flows into the respective chamber.

The capacity of the container must be selected in such a way that the container is capable of confining the entire body of water in the housing with the exception of that quantity which is in the process of being discharged from the container. In other words, the capacity of the container must match or approximate that of the chamber for fresh water.

The above described conventional machine exhibits several important advantages. Thus, the housing is compact and the freshly brewed beverage can be dispensed without the need for a separate coffee pot as is customary in many presently known automatic coffee or tea makers. However, the machine also exhibits certain serious drawbacks, particularly as concerns the quantity of hot coffee which can be brewed therein. The quantity is limited, primarily because the pressure in the region of the supply of comminuted coffee beans and the pressure of hot water which is supplied to the filter cannot exceed atmospheric pressure. The rate of flow of freshly brewed beverage from the filter is slow, especially if the filter contains a relatively large quantity of comminuted coffee beans. This is the reason that such machines failed to gain widespread acceptance. As a rule, machines of the aforedescribed type are used soley for the brewing of small quantities of fresh coffee.

It is also known to design a coffee or tea making machine in such a way that the interior of the housing can be maintained at an elevated pressure. This renders it possible to brew larger quantities of hot beverages per unit of time. Thus, and since the pressure of hot water which is caused to flow toward the filter in order to contact the comminuted beans is well above atmospheric pressure, the water can penetrate through the filter at a relatively high rate. However, such types of brewing machines are invariably furnished with separte pots or like vessels for collection and temporary storage of freshly brewed beverages. Moreover, the housings of conventional machines wherein hot water can be maintained at an elevated pressure do not resemble or constitute carafes with adjacent but separate chambers for fresh liquid and hot beverage.

OBJECTS OF THE INVENTION

An object of the invention is to provide a novel and improved machine for brewing hot beverages which is designed in such a way that it exhibits all advantages but does not exhibit the drawbacks of the aforediscussed conventional machines.

Another object of the invention is to provide a machine for brewing coffee, tea or other hot beverages wherein the housing resembles or constitutes a carafe even though the machine can brew large quantities of beverages per unit of time.

A further object of the invention is to provide a machine which need not be furnished with a discrete vessel for the beverage.

An additional object of the invention is to provide a novel housing and a novel filtering unit for use in the above outlined machine.

Still another object of the invention is to provide a machine which can employ any one of a variety of electric heating means for fresh liquid (such as milk or water) and wherein such heating means can be confined in a space-saving manner.

A further object of the invention is to provide a machine which is simple to manipulate, which can be readily and rapidly taken apart for the purposes of cleaning or refilling with liquid and/or a supply of flavoring agent, and wherein heated liquid is compelled to contact the entire supply of flavoring agent when the machine is in use.

Another object of the invention is to provide a machine which can be mass-produced at a reasonable cost, which is of eye-pleasing appearance, and which can be used for the brewing of relatively small or relatively large quantities of hot beverages.

An additional object of the invention is to provide a machine wherein the supply of flavoring agent is or can be uniformly distributed in the allotted space to ensure more predictable contact with heated liquid, and wherein the pressure of heated liquid can be well above atmospheric pressure without risking the escape of steam and/or hot water.

A further object of the invention is to provide a novel and improved method of brewing large quantities of hot beverages per unit of time in a compact machine.

Still another object of the invention is to provide the machine with a novel and improved system for conveying heated liquid into contact with the supply of flavoring agent.

An additional object of the invention is to provide a novel and improved reusable filter for use in the above outlined machine.

A further object of the invention is to provide a novel and improved mounting for the riser in the above outlined machine for the brewing of hot coffee, tea or other beverages.

Another object of the invention is to provide a machine which can accept a reusable filter or disposable filters.

A further object of the invention is to provide a machine which can be used for the brewing of coffee or tea without the need for any changes in the mode of operation and/or design.

SUMMARY OF THE INVENTION

The invention resides in the provision of a machine for brewing hot beverages by contacting a flavoring agent (such as tea leaves or comminuted coffee beans) with a heated liquid (such as water), particularly an automatic coffee or tea maker. The improved machine comprises a substantially carafe-shaped hollow body or housing with at least one partition which divides the interior of the housing into a first chamber for liquid and a second chamber for the beverage, a filtering unit which is disposed in the housing above the partition and has means for receiving a supply of flavoring agent, means for heating and for thus pressurizing the liquid in the first chamber, means for conveying heated and pressurized liquid from the first chamber into the filtering unit (the latter comprises means for discharging the thus obtained beverage into the second chamber), and a cover for the filtering unit. The housing and the cover comprise means for sealingly but separably connecting the cover to the housing with a force which suffices to resist the pressure of heated liquid in the housing.

The conveying means of the improved machine comprises means for distributing heated and pressurized liquid in the receiving means, e.g., by sprinkling or spraying heated liquid over the supply of flavoring agent in the filtering unit. Such conveying means preferably further comprises a riser which serves to convey heated and pressurized liquid from the first chamber to the distributing means.

The receiving means can comprise a bottom wall with an opening which receives heated liquid from the riser, and the distributing means of such machine can comprise at least one nozzle which receives heated liquid from the opening in the bottom wall of the receiving means. The bottom wall of the receiving means can be provided with a downwardly extending nipple which serves to convey heated liquid from the open upper end of the riser to the opening. The nozzle can comprise a top wall above the opening of the bottom wall and an annulus of webs which connect the top wall of the nozzle with the bottom wall of the receiving means. Such nozzle further comprises apertures (e.g., in the form of substantially vertical slots) which alternate with the webs and communicate with the opening and with the interior of the receiving means. In accordance with a presently preferred embodiment of the nozzle, the webs together form a hollow conical frustum which tapers in a direction from the bottom wall of the receiving means toward the top wall of the nozzle. The webs are or can be identical in size and shape, and the neighboring webs of the annulus are preferably equidistant from each other. The mutual spacing of neighboring webs can match the width of a web in the circumferential direction of the annulus of webs. In other words, a web could snugly fit into each of the apertures.

The receiving means further comprises an annular or otherwise configured circumferentially complete sidewall which extends upwardly from the bottom wall, and the means for discharging freshly brewed hot beverage into the second chamber can include windows in the sidewall. Such filtering unit further comprises a filter which overlies the windows in the sidewall of the receiving means. The filter can constitute a reusable filter, e.g., a filter which can be used again and again as contrasted with a disposable filter which is discarded after a single use. A presently preferred filter comprises a frame with windows, and a screen which overlies the windows in the frame.

The filtering unit can further comprise means for retaining the filter within the sidewall of the receiving means. The retaining means can comprise a pair of spaced-apart concentric rings and webs or ribs which extend between the two rings and alternate with windows for the flow of beverage from the supply of flavoring agent into the windows of the filter and thence into the windows of the sidewall of the receiving means. The bottom wall of the receiving means can be provided with a socket for one of the rings, and the other ring is preferably adjacent to and is surrounded by the sidewall of the receiving means. The other ring is disposed at a level above the one ring, and the windows of the sidewall are preferably disposed at a level between the socket and the other ring. The sidewall of the receiving means can be provided with an annular internal shoulder which is adjacent the other ring. The retaining means can be more or less permanently secured, e.g., bonded, to the sidewall of the receiving means. For example, the other ring can be welded to the internal shoulder of the sidewall.

In accordance with a modification, the filtering unit can comprise an upper section and a lower section. The upper section constitutes or includes the means for receiving a supply of flavoring agent, and the distributing means includes a foraminous top wall for the upper section. The conveying means of such machine comprises channels which are provided in the upper and lower sections to supply heated liquid onto the foraminous top wall which ensures uniform distribution of heated liquid over the supply of flavoring agent in the upper section of the filtering unit. The upper section has a bottom wall which supports the supply of flavoring agent, and the means for discharging the beverage from the filtering unit includes openings in the bottom wall of the upper section. The twin-section filtering unit can further comprise a filter which is provided in the upper section above the latter's bottom wall to support the supply of flavoring agent beneath the foraminous top wall. The filter on the bottom wall of the upper section can constitute an expendable or throw-away filter, e.g., a standard paper filter which is discarded after a single use.

The discharging means of the just described filtering unit preferably further comprises an outlet which is provided between the two sections and establishes a path for the flow of freshly brewed beverage from the openings in the bottom wall of the upper section into the second chamber of the housing.

The riser of the machine which comprises the twin-section filtering unit can be designed to deliver heated and pressurized liquid into a nipple which extends downwardly from the bottom wall of the upper section and serves to deliver heated liquid to the channels of the lower section. The hole of the nipple preferably includes an enlarged upper portion which communicates with the channels of the lower section. The channels of the lower section can consititute grooves in the upper side of the lower section and can extend substantially radially outwardly from the enlarged portion of the hole in the nipple. The channels in the upper section of the filtering unit preferably extend upwardly from the channels of the lower section and have discharge ends which admit heated liquid onto the foraminous top wall, i.e., onto the means for distributing heated liquid over the supply of flavoring agent in the filtering unit. The upper section can be provided with a substantially conical liquid spreading element which extends with clearance into the enlarged portion of the hole in the nipple to divert ascending hot liquid into the channels of the lower section. The foraminous top wall can be provided with an annular marginal portion which abuts the annular upper end of the upper section.

At least the upper section of the twin-section filtering unit can have a substantially circular outline, and the enlarged portion of the hole in the nipple of the lower section can be located at the center of the upper section. The distribution of channels in the sections of this filtering unit is preferably such that the channels of the lower section extend substantially radially outwardly from the enlarged portion of the hole so that their outer ends are remote from the enlarged portion. The channels of the upper section are or can be substantially vertical and are preferably adjacent the peripheral surface of the upper section. The lower ends of channels in the upper section communicate with the outer ends of channels in the lower section, and the channels of the upper section are or can be equidistant from each other. The openings in the bottom wall of the second section are preferably equidistant from the center of the upper section, and the distance of channels in the upper section from the center of the upper section is preferably a multiple of the distance of the openings from the center of the upper section.

The upper side of the bottom wall of the upper section can be provided with ribs which extend substantially radially outwardly from the center of the upper section. Such bottom wall can be provided with additional ribs which alternate with the radially extending ribs and extend radially inwardly toward but short of the center of the upper section. The openings in the bottom wall of the upper section preferably alternate with the radially outwardly extending ribs, and the additional ribs are preferably disposed radially outwardly of the respective openings. The ribs define a plurality of paths for the flow of hot beverage toward the openings, i.e., into the means for discharging freshly brewed beverage into the second chamber of the housing. The upper side of the bottom wall of the upper section can include pairs of sloping surfaces which flank the ribs (or at least the radially outwardly extending ribs) and are spaced apart from the underside of a disposable or reusable filter.

The machine can comprise ribs, arms or analogous parts for integrally connecting the riser of the liquid conveying means to the housing so that the riser is located in the first chamber wherein its lower end receives a stream of liquid (such as hot water and/or steam) and its upper end admits heated liquid into the aforementioned nipple. The at least one partition is or can be integral with the securing means, and the filtering unit is disposed on top of the first chamber beneath the separable cover. The housing can be provided with a compartment which is disposed beneath the first chamber and receives the heating means. Such housing can further comprise a detachable bottom wall beneath the compartment.

The aforementioned foraminous top wall of the distributing means can be designed and dimensioned to rest directly on top of the supply of flavoring agent in the filtering unit.

In accordance with a modification, the housing can further comprise a hollow base beneath the first and second chambers, and the heating means can include at least one halogen lamp in the base. The latter can include an annular internal flange beneath the second chamber, and such flange can define an opening beneath the first chamber. The at least one lamp is then disposed beneath such opening of the flange. The heating means can further comprise a reflector for the at least one lamp. Such reflector can be provided with a substantially semicylindrical or hemispherical concave radiation reflecting surface which partially surrounds the lamp. The latter is preferably located at the focal point of the reflecting surface. The reflector can be provided with outwardly extending marginal portions resting on internal support means of the base.

The heating means can comprise at least one thick film conductor. A housing portion beneath the second chamber can be provided with a downward extension (e.g., a cylindrical extension or an extension in the form of several prongs) which supports the heating means. The heating means can further comprise carrier means for the at least one thick film conductor, and such carrier means can be mounted on the aforementioned extension. If the first chamber is open from below, the heating means can include a ceramic panel which is disposed above the at least one thick film conductor and seals the open lower end of the first chamber.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

FIG. 5 is an enlarged bottom plan view of the main section of the filtering unit;

FIG. 7 is an enlarged horizontal sectional view as seen from the line VII—VII in FIG. 6, showing a nozzle which is used in the machine of FIG. 1 to distribute heated liquid into the supply of flavoring agent in the filtering unit;

FIG. 8 is an enlarged fragmentary axial sectional view of the filtering unit, showing the filter in the main section and the retaining device for the filter in operative position;

DESCRIPTION OF PREFERRED EMBODIMENTS

Figure 1:
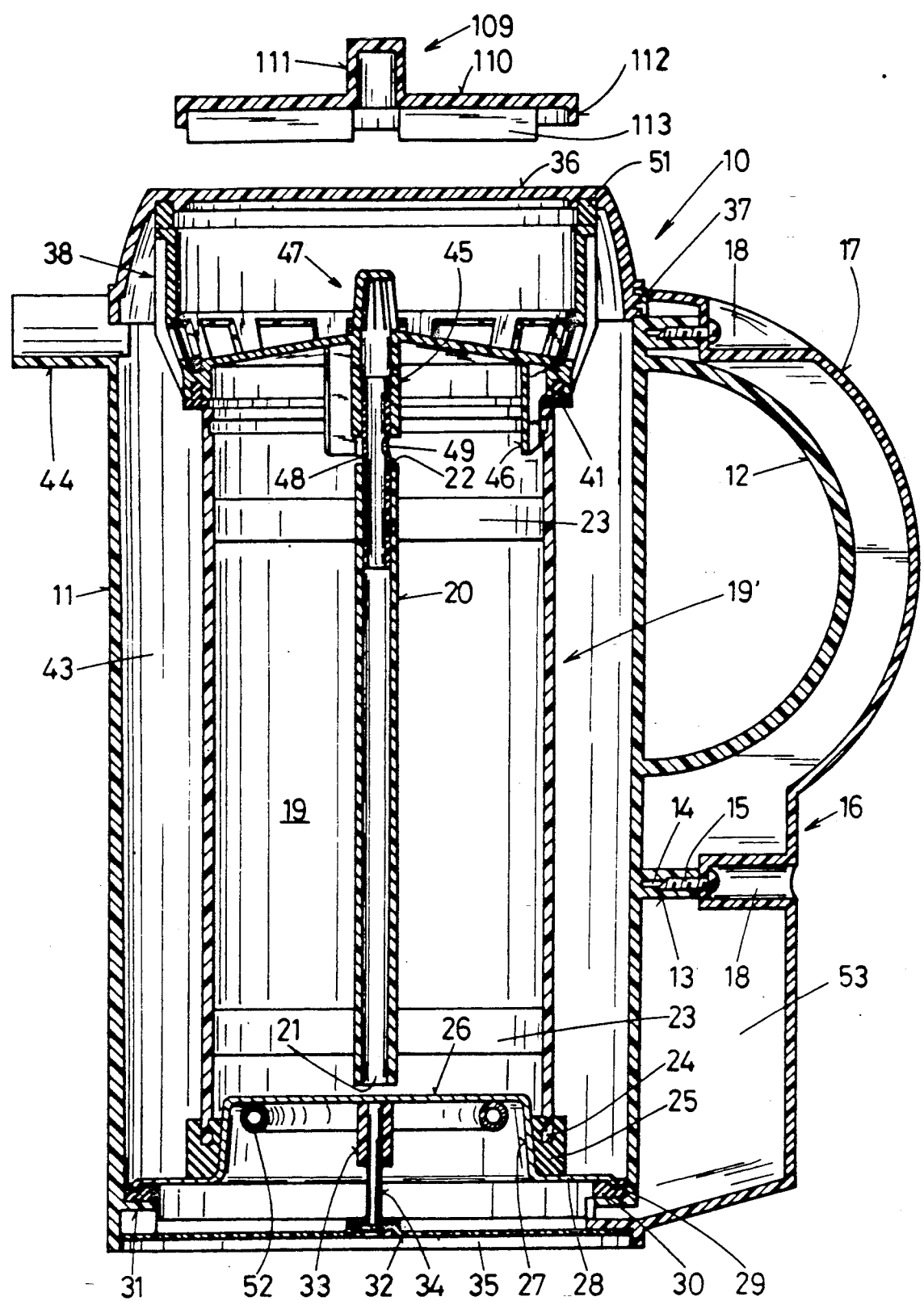
FIG. 1 is a central vertical sectional view of an assembled machine for brewing coffee, tea or other hot beverages which embodies one form of the invention, a device for uniformly distributing the supply of flavoring agent in the filtering unit being shown at a level above the cover.

FIGS. 1 to 8 show certain details of an appliance 10 which can be used as an automatic coffee, tea or chocolate brewing machine and is particularly suited for use as a coffee or tea maker. Only those parts of the improved machine are shown in full detail which are necessary for the understanding of the invention. For example, FIGS. 1 to 8 do not show any electrical and/or electronic components with the sole exception of an electrical resistance heating unit 52 which is used to heat a supply of liquid (particularly water) in a liquid receiving first chamber 19. Furthermore, the drawing does not show the electric cable, the signal generating components, the switches, the liquid level indicator and certain other parts because they are not directly related to the present invention. All parts which are not specifically shown but are necessary or desirable for satisfactory operation of the improved machine 10 are or can be identical with or similar to analogous parts of conventional machines and can be installed in or on the machine in the same way as in available coffee makers, tea makers or like machines.

The machine 10 of FIGS. 1 to 8 comprises a substantially carafe-shaped upright housing 11 the main (outer) portion of which is an open-ended cylinder which is preferably made of a plastic material, particularly a material which is a good insulator of heat. The right-hand portion of the housing 11 is provided with an integral outwardly extending arcuate portion 12 which forms part of a handle when the machine 10 is fully assembled, namely when the housing 11 is connected with a separately produced attachment 16 having an arcuate upper portion 17 which spacedly surrounds the housing portion 12. The housing 11 is further provided with external projections 13 in the form of substantially radially outwardly extending tubular elements which may but need not be provided with internal threads to take the shanks of screws, bolts or analogous threaded fasteners 15. The blind holes 14 of the two projections 13 which are shown in FIG. 1 are tapped. Alternatively, the material of the projections 13 can be selected in such a way that the shanks of the fasteners 15 automatically cut therein internal threads when they are driven home to assume the positions which are shown in FIG. 1. At such time, the heads of the fasteners 15 are confined in recesses 18 which are provided in the aforementioned attachment 16 at levels above and below the arcuate upper portion 17, namely in line with the respective projections 13.

The lower portion of the attachment 16 and the adjacent portion of the cylindrical outer wall of the housing 11 define a compartment 53 which serves to receive electrical, electronic and/or other components of the machine 10. The compartment 53 can further comprise a standard sheath which extends from the attachment 16 and serves to surround and prevent excessive flexing of the respective portion of the electric cable (not shown).

The housing 11 further comprises at least one partition (FIG. 1 shows a single substantially cylindrical partition 19') which divides the internal space of the housing into the aforementioned liquid receiving first chamber 19 (hereinafter called water chamber) and an annular or substantially annular second chamber 43 for reception of a hot beverage (hereinafter called coffee chamber). The water chamber 19 of the machine 10 which is shown in FIG. 1 is at least partially surrounded by the coffee chamber 43.

An elongated upright riser 20 is located at the center of the water chamber 19 and is coaxial with the partition 19'. The riser is an integral part of the partition 19' and, to this end, the housing 11 comprises two sets of securing means 23 which extend radially of and between the partition 19' and riser 20. Each securing means 23 can comprise four equidistant radially extending reinforcing arms or ribs. The number of securing means 23 can be reduced to one or increased to three or more. The lower securing means 23 is adjacent the open lower end 21 of the riser 20, and the upper securing means 23 is adjacent the open upper end 22 of the riser. The lower end 21 of the riser 20 is adjacent but slightly spaced apart from the horizontal central portion of a preferably metallic insert 26 of heat-conducting material. The insert 26 cooperates with two annular sealing elements 25, 30 to seal the lower end of the water chamber 19 as well as to seal the lower ends of the chambers 19, 43 from each other and from the atmosphere.

The lower end portion of the partition 19' is sealingly received in a circumferentially complete groove of the sealing element 25 which is caused to sealingly engage the external surface of a substantially cylindrical downward extension 27 of the insert 26 and the upper side of a substantially washer-like portion 28 which extends radially outwardly from the lower end of the extension 28 and includes a downwardly bent outer marginal portion 29 in deforming engagement with the upper side of the sealing element 30. An advantage of the just described design of the insert 26 is that the sealing element 25 is in pronounced surface-to-surface contact with the outer side of the extension 27 as well as with the upper side of the washer-like portion 28. This reduces the likelihood of leakage of water from the chamber 19 into the chamber 43 and/or leakage of coffee from the chamber 43 into the chamber 19. The underside of the central portion of the insert 26 has a downwardly extending centrally located elongated vertical nut 33 which receives the externally threaded shank of a fastener 34. The head of the fastener 34 is received in a recess at the underside of a circular plate-like bottom wall 32. The housing 11 and the attachments 16 jointly form a skirt 35 which extends downwardly beyond the underside of the bottom wall 32 and serves as a ring-shaped leg which contacts the upper side of a table, a counter or any other support for the machine 10.

The housing 11 is provided with an internal platform 31 which carries the sealing element 30. The latter is deformed by the outer marginal portion 29 of the insert portion 28 and bears against the platform 31 under the action of the fastener 34. This ensures that the lower portion of the coffee chamber 43 is adequately sealed from the atmosphere. The platform 31 is an integral part of the housing 11 and is made at the time the main portion of the housing is formed in a mold or the like.

The cylindrical portion 27 of the insert 26 cooperates with the sealing element 25 to properly center the lower end portion 24 of the partition 19' and the riser 20 with reference to the main portion of the housing 11. The lower end portion 24 of the partition 19' can constitute a circumferentially complete body or it may consist of several legs which are spaced apart from each other in the circumferential direction of the partition and each of which is caused to deform the sealing element 25 without necessarily penetrating into the material of this sealing element.

The bottom wall 32 not only serves to hold the insert 26 and the sealing elements 25, 30 in optimum positions but also enhances the stability of the lower portion of the attachment 16. This bottom wall is removed if one wishes to gain access to the electric resistance heating element 52 which is installed in the space within the cylindrical portion 27 of the insert 26 and transmits heat to the central portion of the insert when the machine 10 is in actual use. The illustrated heating element 52 spacedly surrounds the downwardly extending nut 33 of the insert 26.

Figure 3:
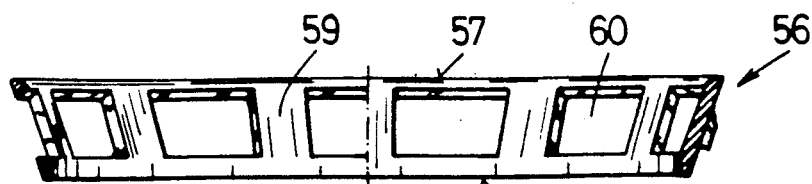
FIG. 3 is a sectional view of the retaining device, substantially as seen in the direction of arrows fron the line III—III of FIG. 2.
Figure 4:
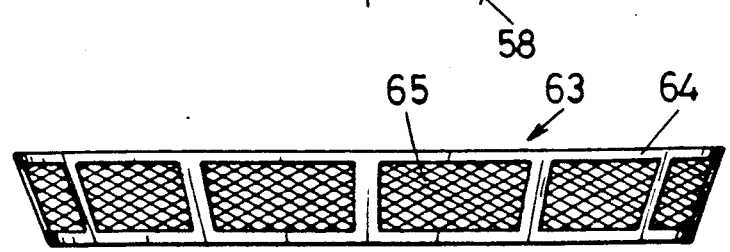
FIG. 4 is an enlarged elevational view of a reusable filter for use in the filtering unit of the machine which is shown in FIG. 1.
Figure 6:
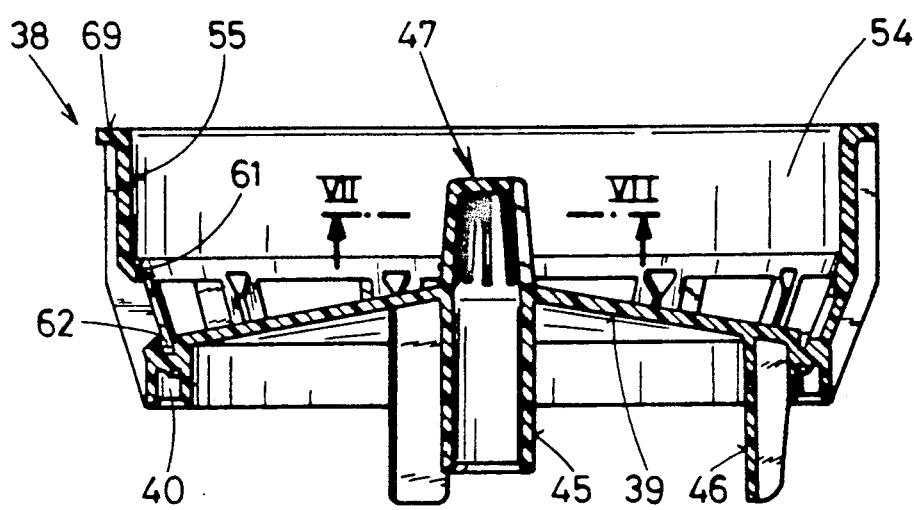
FIG. 6 is a sectional view of the main section of the filtering unit, substantially as seen in the direction of arrows from the line VI—VI of FIG. 5.
Figure 2:
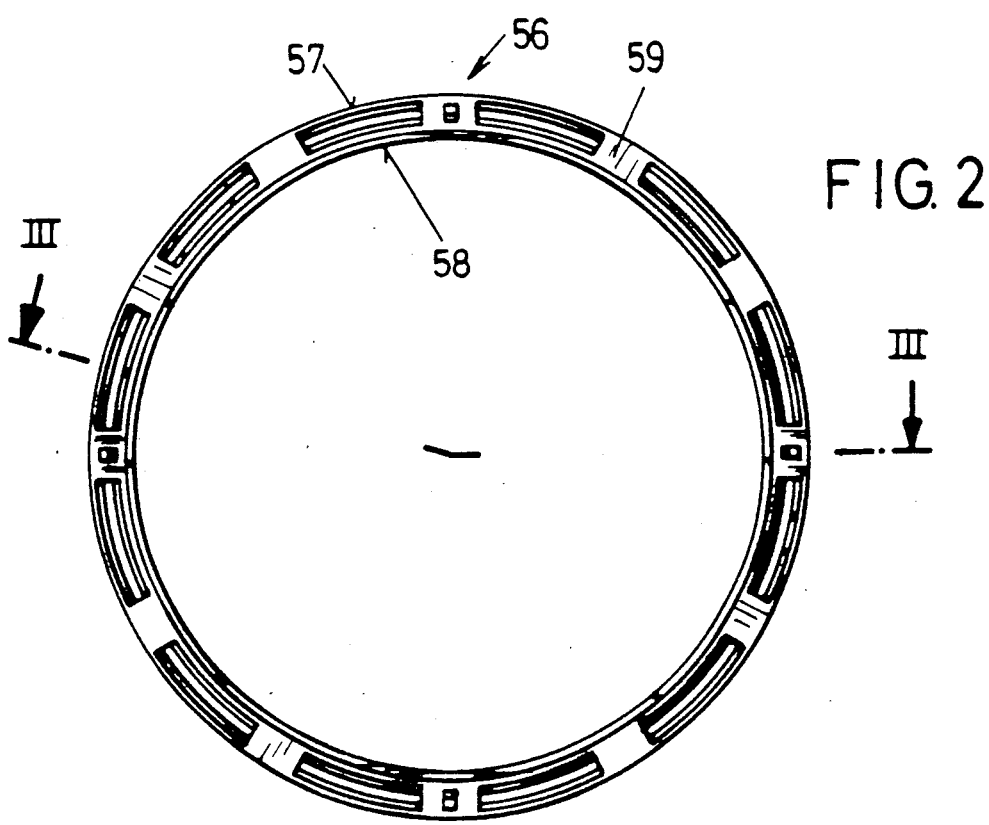
FIG. 2 is an enlarged plan view of a retaining device which forms part of the filtering unit and serves to hold in position a reusable filter of the filtering unit.

The machine 10 further comprises a filtering unit 38 which is removably installed in the housing 11 above the partition 19'. This filtering unit comprises a main portion which is shown in FIGS. 5 and 6, a reusable filter 63 which is shown in FIG. 4, and a ring-shaped filter retaining device 56 which is shown in FIGS. 2 and 3. Furthermore, the main portion of the filtering unit 38 is integral with a nozzle 47 which constitutes a means for distributing hot water over and/or in a supply of flavoring agent (such as comminuted coffee beans) in the space 54 above the bottom wall 39 and within the annular sidewall 55 of main portion of the filtering unit 38. The bottom wall 39 of the main portion of the filtering unit 38 is integral with a downwardly extending nipple 45 forming part of the means (further including the riser 20) for supplying hot water from the chamber 19 into the nozzle 47.

The bottom wall 39 of the main portion of the filtering unit 38 is a conical frustum which has a centrally located opening for the flow of hot water from the nipple 45 into the nozzle 47. The latter extends upwardly from the central portion of the bottom wall 39. The sidewall 55 has a circular outline and is integral with the marginal portion of the bottom wall 39. The upper portion of the sidewall 55 is a circumferentially complete cylinder, and the lower portion of this sidewall is a hollow conical frustum with windows 42 which serve as a means for discharging the beverage from the space 54 into the coffee chamber 43 of the housing 11.

In the filtering unit 38 of FIGS. 1 to 8, the nozzle 47 and the nipple 45 are integral parts of the bottom wall 39 which slopes gradually upwardly in a direction from the lower portion of the sidewall 55 toward the centrally located opening beneath the nozzle 47.

The details of a presently preferred distributing nozzle 47 are shown in FIG. 7. This nozzle comprises a top wall 66 which is spaced apart from the opening in the central portion of the bottom wall 39 and is integral with an annulus of webs or ribs 67 which connect it to the bottom wall 39. The webs 67 alternate with slot-shaped apertures 68. The illustrated nozzle 47 has eight webs 67 and an equal number of apertures 68. That portion of the nozzle 47 which includes the webs 67 resembles a hollow conical frustum and tapers upwardly in a direction from the bottom wall 39 toward the top wall 66. The width of each web 67 (in the circumferential direction of the sidewall 55) can match or approximate the width of an aperture 68. The apertures 68 are or can be designed in such a way that each thereof can snugly receive a web 67. The purpose of the apertures 68 is to direct streamlets of hot water into the supply of flavoring agent on the bottom wall 39 of the main portion of the filtering unit 38.

The bottom wall 39 includes a relatively thick marginal portion or rim the underside of which is provided with an annular groove or recess 40 (see particularly FIG. 8) for a portion of an annular sealing element 41 (FIG. 1) which rests on top of the partition 19'. The bottom wall 39 is further integral or rigidly connected with several (e.g., three, see FIG. 5) preferably equidistant centering projections or legs 46 which extend downwardly from the bottom wall 39 and frictionally engage the inner side of upper portion of the partition 19' radially inwardly of the socket 40 and sealing element 41. When the main portion of the filtering unit 38 is lifted off the partition 19', it can be caused to rest on a supporting surface (e.g., on the upper side of the counter or table) which is contacted by the lower end portions of the legs 46. The illustrated legs 46 are angularly offset from each other by 120° in the circumferential direction of the rim at the marginal portion of the bottom wall 39. Each of the three legs 46 has a substantially T-shaped cross-sectional outline. In order to reinsert the main portion of the filtering unit 38 into the housing 11, the legs 46 are caused to slide along the internal surface of the partition 19' whereby the rim of the bottom wall 39 receives the upwardly extending annular portion of the sealing element 41 if the latter is bonded to the upper end of the partition 19'. If the sealing element 41 is more or less permanently anchored in the socket 40, it automatically comes to rest on the upper edge face of the partition 19' when the bottom wall 39 is moved to the position of FIG. 1 in which the legs 46 are in frictional engagement with the internal surface of the partition. The sealing element 41 then seals the upper end of the water chamber 19 from the atmosphere, i.e., hot water which flows from the chamber 19 is compelled to ascend in the riser 20 and to flow into the nozzle 47 by way of the nipple 45. The latter is automatically slipped onto the open upper end 22 of the riser 20 when the legs 46 are caused to slide downwardly along the internal surface of the partition 19'.

FIGS. 1 and 6 show that the lower ends of the legs 46 extend to a level beneath the lower end of the nipple 45. This ensures that the nipple 45 does not contact the surface which supports the legs 46 when the main portion of the filtering unit 38 is detached from the housing 11. Three equidistant legs 46 normally suffice to impart to the removed main portion of the filtering unit 39 the necessary stability on a supporting surface.

The means (bottom wall 39 and sidewall 55) for receiving a supply of flavoring agent accommodates the aforementioned filter 63. The latter resembles a short conical frustum which tapers downwardly (toward the bottom wall 39 in inserted position of the filter) and has a frame 64 and a screen or sieve 65. The frame 64 includes two vertically spaced-apart rings and ribs or webs which extend between the two rings and define several large windows overlying the windows 42 in the lower portion of the sidewall 55 when the filter 63 is properly installed in the main portion of the filtering unit 38 so that it surrounds the supply of flavoring agent on the bottom wall 39. The frame 64 is preferably made of a plastic material, and the screen 65 overlaps each window of the frame to ensure that the flavoring agent cannot escape into the coffee chamber 43 via windows 42 on the lower portion of the sidewall 55. The screen 65 can be of the type used in so-called "Goldfilters Nos. 017" which are distributed by the assignee of the present applications as accessories for various coffee makers of the assignee, for example, coffee makers known as #264, #268, #259, #261, #150, #152, #154, #164, and #165. The filter 63 can be reused many times (for example, hundreds of times) and, therefore, is often preferred to so-called filter papers.

The filtering unit 38 further comprises the aforementioned retaining device 56 which serves to indirectly hold the filter 63 in proper position in the space 54 within the sidewall 55. The retaining device 56 of FIGS. 2 and 3 is a short hollow conical frustum which is made of a suitable plastic material and includes a larger-diameter upper ring 57, a smaller-diameter lower ring 58, webs or ribs 59 which extend between and connect the rings 57, 58 to each other, and windows 60 which alternate with the webs or ribs 59 in the circumferential direction of the retaining device and overlie the windows of the frame 64 forming part of the filter 63 when the filtering unit 38 is fully assembled. At such time, the windows 60 overlie the adjacent portions of the screen 65 (see FIG. 8), the lower ring 58 extends into a socket 62 at the upper side of the rim of the bottom wall 39, and the upper ring 57 is adjacent and preferably abuts an annular internal surface of shoulder 61 of the frustoconical lower portion of the sidewall 55. The filter 63 is accessible for inspection, cleaning or replacement upon removal of the retaining device 56.

The sidewall 55 and the retaining device 56 can be provided with suitable complementary male and female detent elements which releasably hold the filter 63 in proper position with reference to the sidewall 55. However, it is often preferred to provide a more or less permanent and hence more reliable connection between the retaining device 56 and the sidewall 55, particularly by bonding the upper ring 57 to the internal surface or shoulder 61. The bonding can involve the application of heat and/or the use of a suitable adhesive.

The socket 62 for the lower ring 58 of the retaining device 56 is located at a level directly above and adjacent the annular groove 40 in the underside of the rim of the bottom wall 39. The internal shoulder or surface 61 is a conical frustum which tapers toward the windows 42 and facilitates proper centering of the retaining device 56 within the confines of the sidewall 55. The windows 42 of the sidewall 55 are located at a level between the socket 62 and the internal surface or shoulder 61.

FIG. 1 further shows a cover 36 which is separably but sealingly connected to the upper end portion of the housing 11 so that it overlies the properly inserted filtering unit 38. To this end, the upper end portion of the housing 11 has an internal thread 37 mating with an external thread on the lower portion of the cover 36. Such connection between the cover 36 and the housing 11 ensures that the pressure in the interior of the housing can rise well above atmospheric pressure without risking uncontrolled escape of hot water and/or steam. A ring-shaped sealing element 51 is inserted between the outwardly extending collar 69 at the upper end of the sidewall 55 and the underside of the top panel of the cover 36. The sealing element 51 can be bonded to the cover 36 and is at least slightly deformed when the cover is properly secured to the upper end portion of the housing 11.

FIG. 1 also shows a separate spreader 109 which can be inserted into the space 54 above the bottom wall 39 prior to attachment of the cover 36 to the housing 11. The purpose of the spreader 109 is to uniformly or nearly uniformly distribute the flavoring agent on the bottom wall 39 around the nozzle 47 before the cover 36 is attached to the housing 11 and before the circuit of the heating element 52 is completed to heat the body of water in the chamber 19. The illustrated spreader 109 comprises a flat-disc-shaped portion 110 with a centrally located upwardly extending hollow cup-shaped handgrip portion 111, a downwardly extending rim 112, and one or more radially or substantially radially extending vanes or blades 113 at the underside of the disc-shaped portion 110. The handgrip portion 111 serves as a means for facilitating rotation of the spreader 109 when the latter is inserted into the sidewall 55 so that the rim 112 is closely or immediately adjacent the inner side of the sidewall and the vanes or blades 113 are ready to distribute the flavoring agent around the nozzle 47 when the handgrip portion 111 is rotated by hand.

The hollow cup-shaped handgrip portion 111 receives the top wall 66 of the nozzle 47 if the space 54 confines a relatively small supply of flavoring agent. If the nozzle 47 is omitted (i.e., if the central portion of the bottom wall 39 is simply provided with an opening which receives hot water from the nipple 45 while the top wall 66 and the webs or ribs 67 are omitted, the spreader 109 can perform the dual function of serving as a means for more or less uniformly distributing the supply of flavoring agent around the central opening of the bottom wall 39 as well as to uniformly distribute the ascending flow of hot water in and over the spread-out supply of flavoring agent on the bottom wall 39. In other words, the spreader 109 then remains in the space 54 while the machine 10 is in actual use. This spreader 109 can also remain in the space 54 if the latter confines a relatively small quantity of flavoring agent so that there is room for the spreader beneath the properly applied and tightened cover 36. The inserted spreader 109 ensures that the flow of hot water which rises through the central opening of the bottom wall 39 is compelled to flow radially outwardly between the vanes or blades 113, and the thus obtained hot beverage then flows through the windows 60 of the retaining device 56, through the windows of the frame 64 of the filter 63, and through the windows 42 of the sidewall 55 on its way into the chamber 43.

The utilization of spreader 109 as a means for uniformly distributing the flavoring agent in the space 54 within the sidewall 55 is desirable and advantageous when a pile of flavoring agent is simply poured or dumped onto the bottom wall 39. In the absence of at least partial distribution of flavoring agent which forms such pile, the flavoring agent could interfere with proper connection of the cover 36 to the upper portion of the housing 11. Moreover, uniform or nearly uniform spreading of flavoring agent around the distributing nozzle 47 enhances the brewing operation and ensures that each part of the supply of properly spread out filtering agent is contacted by identical quantities of hot water.

FIG. 1 further shows that the upper end 22 of the riser 20 need not extend all the way into the nipple 45 at the underside of the bottom wall 39. The means for conveying hot water from the chamber 19 into the nozzle 47 further comprises a relatively short tube or pipe 48 which is partially telescoped into the nipple 45 and in part into the upper end portion of the riser 20. This pipe or tube can be said to constitute an upward extension of the riser 20 or a downward extension of the nipple 45, and is provided with one or more radial openings 49 which establish communication between the path for the upward flow of hot water and the upper portion of the water chamber 19. The opening or openings 49 are provided at a level above the open upper end 22 of the riser 20 and below the open lower end of the nipple 45. The purpose of the opening or openings 49 is to ensure that water the temperature of which is below a predetermined lower threshold value does not enter the nozzle 47 but merely circulates from the lower end 21 of the riser 20, through the opening or openings 49, through the chamber 19 and back to the open lower end 21. Moreover, a certain percentage of steam can flow from the riser 20, through the opening or openings 49 and into the upper portion of the chamber 19 when the machine 10 is in the process of brewing hot coffee.

As mentioned above, the sealing element 51 can be bonded to the underside of the top portion of the cover 36 to ensure that this sealing element is lifted with the cover when the user of the machine 10 desires to gain access to the filtering unit 38. Alternatively, the underside of the top portion of the cover 36 can be provided with a circumferentially complete groove or with a set of arcuate grooves for the upper portion of the sealing element 51 so that the latter can be held in the groove or grooves by friction and need not be actually bonded to the cover 36. Proper connection of the cover 36 to the housing 11 (at 37) ensures at least some deformation of the sealing elements 41 and 51 to thus even further reduce the likelihood of uncontrolled escape of hot water and/or steam from the space 54.

The cylindrical outer portion of the housing 11 is provided with a spout 44 which is disposed at the level of the lower portion of the cover 36 and enables the user of the machine 10 to pour a hot beverage from chamber 43 directly into a coffee cup or into another receptacle for hot coffee. Hot coffee can be poured from the chamber 43 while the cover 36 remains attached to the housing 11.

The operation of the machine 10 is as follows:

In order to enable the user to pour or to otherwise introduce (e.g., with a spoon) a desired quantity of flavoring agent into the space 54 within the sidewall 55 of the filtering unit 38, the cover 36 is detached from the upper end portion of the housing 11 and the filtering unit 38 is thereupon lifted out of the housing 11. This exposes the upper end of the chamber 19 which is ready to receive a body of fresh water, e.g., a quantity which is needed to brew a certain number of cupfuls.

The next step involves the introduction of a desired or necessary quantity of flavoring agent into the space 54, either while the legs 46 rest on a supporting surface or subsequent to reinsertion of the unit 38 into the upper portion of the housing 11. The spreader 109 is used to uniformly distribute the selected quantity of flavoring agent around the nozzle 47, preferably while the filtering unit 38 is properly installed in the upper portion of the housing 11. Of course, it is equally possible to use a spoon or any other tool in lieu of the spreader 109 in order to distribute the flavoring agent on the bottom wall 39.

The aforementioned pipe or tube 48 is assumed to be more or less permanently telescoped into the upper end portion of the riser 20 so that, when the filtering unit 38 is inserted into the housing 11, the upper portion of the pipe or tube 48 enters the nipple 45 while the legs 46 of the main portion of the unit 38 slide downwardly along the internal surface of the partition 19'. The sealing elements 41 and 51 are automatically deformed in response to proper connection of the cover 36 with the upper end portion of the housing 11. The lower ends of the chambers 19 and 43 are sealed by the aforediscussed sealing elements 25 and 30 in cooperation with the insert 26 and the lower end portion 24 of the partition 19'.

The next step involves connection of the heating element 52 in circuit with a source of electrical energy by actuating a standard on-off switch or the like, not shown. The heating element 52 heats the insert 26 which, in turn, heats the body of water in the chamber 19. As the temperature of water rises, the upper portion of the chamber 19 gathers steam and the pressure in the chamber 19 rises. This causes water to ascend in the riser 20. At least some steam which has penetrated into the riser 20 via the open lower end 21 leaves the conveying means via opening or openings 49 in the pipe or tube 48 to reenter the chamber 19. A flow of hot water rises into the nipple 45 and is distributed by the nozzle 47 to contact all portions of the supply of flavoring agent in the space 54 beneath the cover 36. The apertures 68 of the nozzle 47 ensure uniform distribution of hot water in the space 54. The height of the supply of flavoring agent in the space 54 is normally selected in such a way that at least a portion (e.g., the top wall 66 and the upper parts of webs or ribs 67) of the nozzle 47 projects upwardly beyond the upper side of the supply of flavoring agent. In fact, the quantity of flavoring agent can be selected in such a way that the entire nozzle 47 remains exposed to spray streamlets of hot water all over the flavoring agent in the space 54. The resulting hot beverage flows toward and through the windows 60 of the retaining device 56, thereupon through the windows in the frame 64 of the filter 63 (i.e., through the screen 65) and thereupon through the windows 42 of the sidewall 55 to enter the chamber 43. The rate of penetration of hot water through the flavoring agent in the space 54 is high because the water is maintained at an elevated pressure. The pressure of hot beverage which issues from the window 42 matches atmospheric pressure. The danger of hot water escaping from the housing 11 is practically nil in spite of elevated pressure in the interior of the housing 11 because of the high rate of flow of hot beverage from the space 54 into the chamber 43.

The beverage can be immediately poured (via spout 44) into one or more coffee cups or into other suitable receptacles. Alternatively, the beverage can remain in the chamber 43 for a shorter or longer period of time. The heating element 52 is preferably adjustable so that, when the brewing operation is completed, the heating element 52 generates less heat, namely an amount which suffices to maintain the beverage in the chamber 43 at a desired temperature. Alternatively, or in addition to the provision of an adjustable heating element 52, the machine 10 can be provided with a discrete second heating element which is put to use when the brewing operation is completed and serves the sole purpose of maintaining the beverage in the chamber 43 at a desired temperature. Such heating system for use in coffee making, tea making or like machines are well known and are disclosed, for example, in numerous United States and foreign patents and patent applications of the assignee of the present application.

The areas of the apertures 68 between the webs or ribs 67 of the nozzle 47 are selected in such a way that hot water which ascends in the riser 20, in the pipe or tube 48 and thereafter in the nipple 45 impinges upon the underside of the top wall 66 of the nozzle 47 and is propelled radially outwardly into the space 54. Abrupt deflection of ascending hot water by the top wall 66 and the pressure of heated water ensure that jets of heated water which enter the space 54 by way of the apertures 68 flow all the way to the sidewall 55, i.e., all the way to the filter 63, to ensure that each and every batch or portion of flavoring agent is contacted by heated water. This enhances the quality of the freshly brewed beverage which gathers in the chamber 43.

The feature that the areas of the apertures 68 in the nozzle 47 match or approximate the cross-sectional areas of the webs or ribs 67 contributes to lower cost of the nozzle 47 and of the entire main portion (including the bottom wall 39 and the sidewall 55) of the filtering unit 38.

The filter 63 can be separably or more or less permanently connected (e.g., welded or glued) to the sidewall 55. This simplifies the construction and reduces the cost of the filtering unit 38 because the retaining device 56 can be omitted. The provision of a retaining device 56 (which is fixedly secured to the sidewall 55) is preferred at this time, especially if the filter 63 is designed to stand long periods of use. If desired (e.g., in order to rapidly gain access to the filter 63), the retaining device 56 can be provided with male or female detent elements (not shown) which cooperate with complementary female or male detent elements of the sidewall 55 to ensure that the retaining device is separably but reliably held in the internal space 54 of the filtering unit 38.

Figure 9:
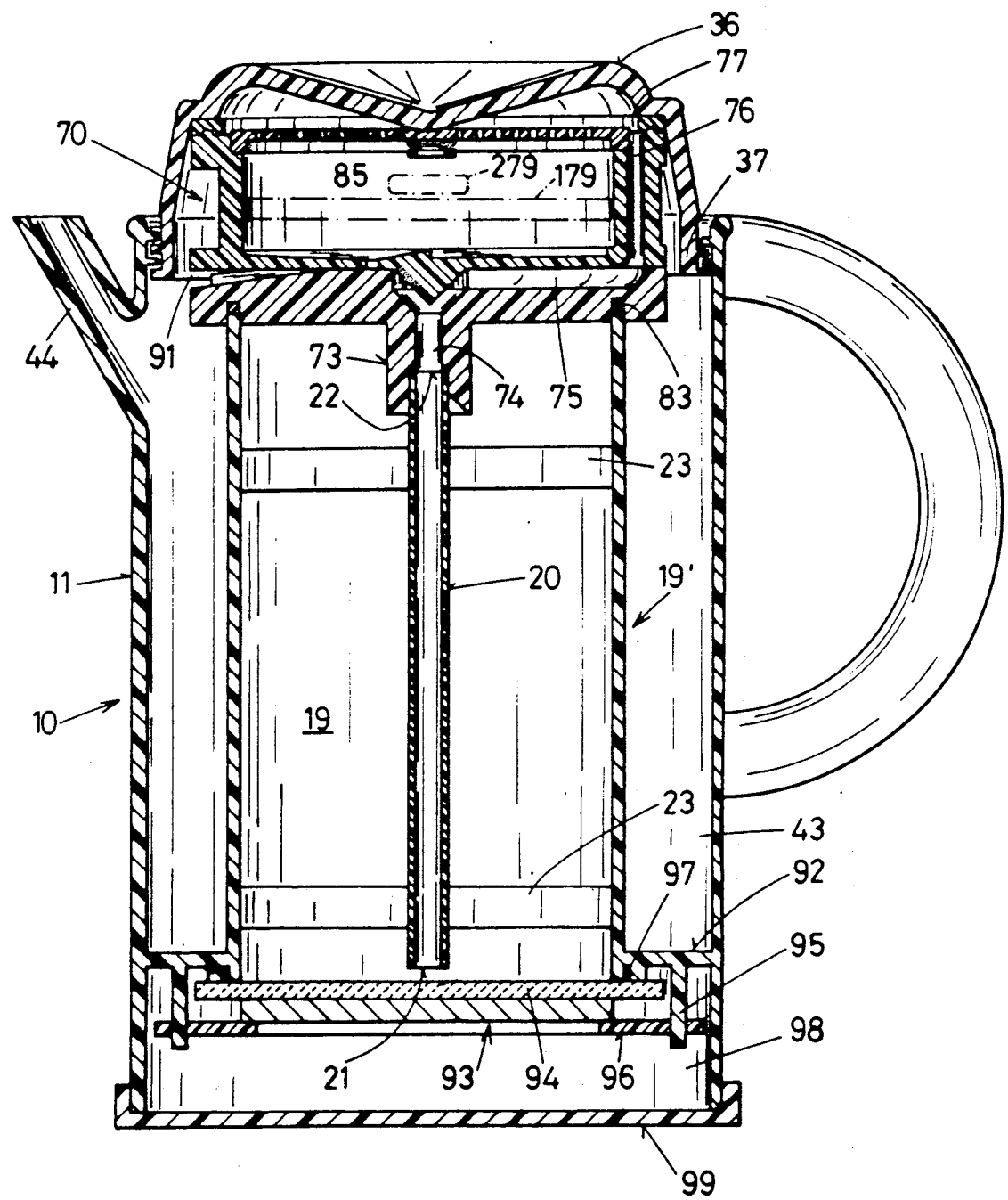
FIG. 9 is a central vertical sectional view of a second machine with a modified filtering unit and a different heating element.
Figure 12:
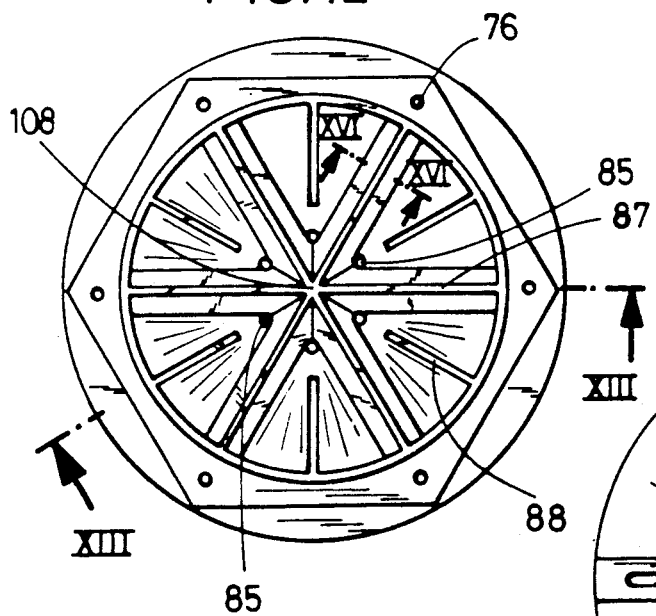
FIG. 12 is a top plan view of the upper section of the filterimg unit which is used in the machines of FIGS. 9 and 10.

FIG. 9 shows a modified machine 10 wherein all such parts which are identical with or clearly analogous to corresponding parts of the machine of FIG. 1 are denoted by similar reference characters. In this embodiment, the outer cylinder of the housing 11, the partition 19', the riser 20 and the reinforcing ribs of the securing means 23 form a one-piece plastic part. This contributes to a reduction of initial cost of the entire machine. The machine 10 of FIG. 9 employs a modified filtering unit 70 the details of which are shown in FIGS. 12 to 15, and a modified hot liquid distributing means for hot liquid in the form of a foraminous top wall 79 which is shown in FIG. 12. The top wall 79 is held in the operative position of FIG. 9 as soon as the cover 36 is properly secured to the upper portion of the housing 11.

The lower portion of the housing 11 cooperates with a detachable bottom wall 99 to define a relatively large compartment 98 for confinement of a modified electric heating element 93 as well as of additional electrical and/or electronic components (not shown) of the improved machine. The bottom wall 99 has an upwardly extending annular rim which surrounds the lowermost portion of the outer wall of the housing 11.

The housing 11 further comprises an annular portion 92 which can be said to constitute the bottom wall for the coffee chamber 43 and has an annular downward extension or skirt 95 for a bottom panel 94 immediately above the heating element 93. The panel 94 can consist of a ceramic material, such as "CERAN" (trademark). The heating element 94 is mounted on a washer-like carrier 96 which is separably held by the extension 95 of the bottom wall 92. An annular sealing element 97 is received in a groove in the underside of the bottom wall 92 and is maintained in deformed condition by the carrier 96 when the latter is properly affixed to the extension 95. The plane of the carrier 96 which is shown in FIG. 9 is parallel to the plane of the bottom wall 99 and to the plane of the panel 94.

The heating element 93 in the machine 10 of FIG. 9 comprises one or more thick film conductors. Reference may be had to commonly owned copending patent application Ser. Nos. 207,762, 207,763 and 207,764, all filed June 16, 1988, now U.S. Pat. Nos. 4,888,465, 4,888,466 and 4,888,467 granted Dec. 19, 1989. A bathroom scale with a thick film conductor is disclosed in commonly owned U.S. Pat. No. 4,765,422 granted Aug. 23, 1988 to Hoffmann.

The filtering unit 70 of the machine 10 which is shown in FIGS. 9 and 12 to 16 comprises a lower section 71 and an upper section 72. Each of these sections is or can constitute a single piece of suitable plastic material of the type normally employed in connection with the making of parts for coffee making, tea making, espresso making, cappuccino making and like machines. The sections 71 and 72 are or can be permanently connected (e.g., glued or welded) to each other. Welding is the presently preferred mode of establishing a permanent bond between the sections 71 and 72.

Figure 14:
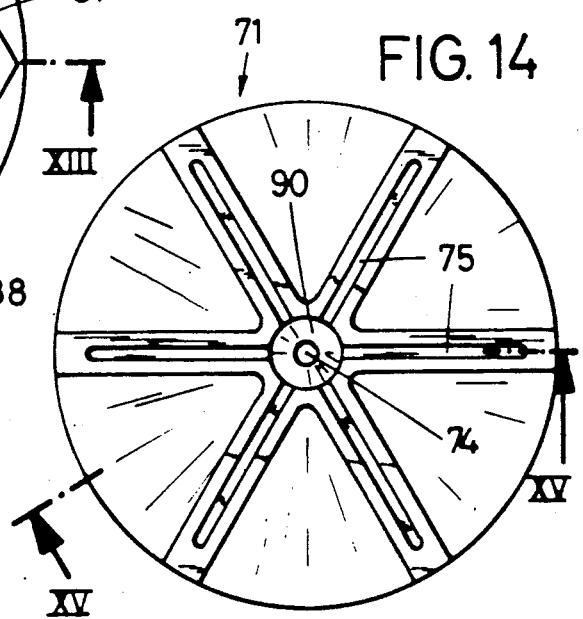
FIG. 14 is a top plan view of the lower section of the filtering unit which can be used in the machine of FIG. 9 or 10.

As can be seen in FIG. 14, the lower section 71 of the filtering unit 70 resembles a disc the upper side of which has several radially extending channels 75 in the form of relatively narrow grooves having radially inner ends in commuication with an enlarged upper portion 90 of an axial hole or bore 74 in a downwardly extending centrally located nipple 73 of the section 71. The outer ends of the channels or grooves 75 terminate short of the peripheral surface of the lower section 71. The angles between neighboring channels or grooves 75 are identical. The lower end of the hole or bore 74 in the nipple 73 is dimensioned to directly receive the upper end portion of the riser 20 when the filtering unit 70 is properly mounted on the partition 19' of FIG. 9. Such direct connection between the riser 20 and the nipple 73 renders it possible to dispense with the pipe or tube 48 of FIG. 1. The underside of the section 71 is provided a circumferentially complete groove 82 (see particularly FIG. 15) for a sealing element 83 (FIG. 9 which engages the upper edge face of the partition 19' when the filtering unit 70 is properly installed in the housing 11.

The bottom wall 86 of the upper section 72 has an inverted conical liquid spreading element 78 which extends into the enlarged portion 90 of the hole 74 with a certain amount of clearance so as to provide a path for the flow of hot water from the open upper end 22 of the riser 20 into the channels or grooves 75 in the upper side of the lower section 71.

The groove 82 can consist of several arcuate portions, as long as it can properly retain a portion of the sealing element 83.

The upper section 72 of the filtering unit 70 has a circular outline (see FIG. 12). The peripheral surface of the section 72 is or preferably constitutes a cylindrical surface, the same as the internal surface which surrounds the space 54 for the supply of flavoring agent. The upper section 72 has a set of substantially vertical channels 76 which are adjacent its peripheral surface and the lower end of each of which communicates with the outer end portion of one of the grooves or channels 75 in the upper side of the lower section 71. The upper or discharge ends 77 (FIG. 9) of the channels 76 are open and serve to supply hot water onto the upper side of the foraminous distributing device or top wall 79 when the machine 10 of FIG. 9 is in use, i.e., when the annular margianl portion 80 of the device 79 is held in sealing engagement with the upper end face of the section 72. The channels 76 are provided in thickened portions of the sidewall of the section 72 (see particularly FIG. 12) and are equidistant from the center 108 of this section. It is clear that the number of channels 76 and channels or grooves 75 can be less than or that it can exceed six.

When the machine 10 of FIG. 9 is fully assembled and the heating element 93 is operative to heat the panel 94 which, in turn, heats the body of water in the chamber 19, hot water ascends in the riser 20 to flow through the hole 74 of the nipple 73 and to be diverted by the spreading element 78 to flow into the substantially horizontal channels or grooves 75. The thus obtained discrete streams of hot water rise in the channels 76 to overflow at 77 onto the upper side of the distributing device or top wall 79. Small streams of hot water penetrate through the pores, interstices or orifices of the top wall 79 to contact the supply of flavoring agent on the bottom wall 86 of the section 72.

Figure 13:
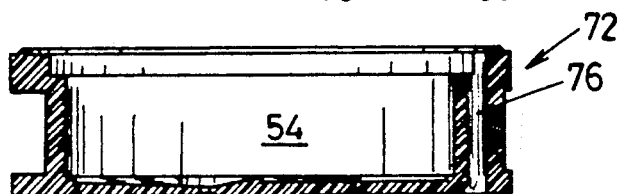
FIG. 13 is a sectional view substantially as seen in the direction of arrows from the line XIII—XIII of FIG. 12.
Figure 15:
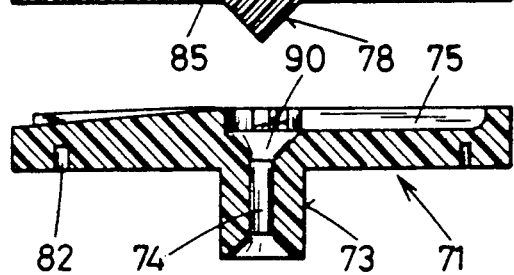
FIG. 15 is a sectional view substantially as seen in the direction of arrows from the line XV—XV of FIG. 14.

FIGS. 12 and 13 further show that the bottom wall 86 of the upper section 72 is provided with an annulus of openings 85 forming part of a means for discharging the beverage from the filtering unit 70 into the coffee chamber 43. Such discharging means further comprises a wedge-like clearance or outlet 91 (FIG. 9) between the sections 71, 72 adjacent the spout 44 of the housing 11. The distance of openings 85 from the center 108 of the upper section 72 is a small fraction of the distance of channels 76 from the center 108. For example, the diameter of the circle which is formed by the channels 76 can be several times the diameter of the circle which is formed by the openings 85 around the center 108 of the section 72.

The upper side of the bottom wall 86 of the section 72 is provided with a star-shaped array of relatively long radially extending ribs 87 which alternate with the openings 85 and with relatively short additional ribs 88 each of which is disposed midway between two neighboring ribs 87 and extends radially inwardly toward but short of the respective opening 85. The ribs 87 and 88 establish passages for the flow of hot beverage toward the openings 85 and thence into the clearance or outlet 91 for gathering in the coffee chamber 43.

Figure 16:
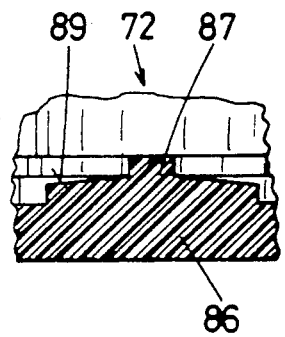
FIG. 16 is a sectional view of a detail of the upper section of the filtering unit for the machine of FIG. 9 or 10, substantially as seen in the direction of arrows from the line XVI—XVI of FIG. 12.

FIG. 16 shows that the upper side of the bottom wall 86 of upper section 72 is provided with pairs of mutually inclined facets or surface portions 89 which flank the radially extending longer ribs 87. The upper sides or top lands of the ribs 87 and 88 serve to support a paper filter (not shown) which is placed onto the bottom wall 86 before the space 54 in the upper section 72 receives a supply (particularly a metered quantity) of flavoring agent, such as comminuted coffee beans. Paper filters are normally dispensable in contrast to filters of the type shown in FIG. 4.

The cover 36 has internal threads which can mate with external threads 37 at the upper end of the housing 11 of the machine 10 which is shown in FIG. 9.

The filtering unit 70 can be provided with screws, bolts, male and female detent elements or the like to establish a separable connection between the sections 71 and 72, i.e., these sections need not be permanently connected (e.g., glued or welded) to each other.

The diameter of the paper filter or another suitable filter which is used in the internal space 54 of the upper section 72 preferably equals or approximates the diameter of the cylindrical internal surface which surrounds the space 54. This ensures that hot water which descends through the bores, pores or interstices of the top wall 79 cannot bypass the filter to flow around and beneath the filter toward and into the openings 85.

If the length of the riser 20 and/or nipple 73 is such that the upper end portion of the riser cannot directly enter the lower end portion of the nipple, the machine 10 of FIG. 9 will employ a pipe or tube corresponding to the pipe or tube 48 of FIG. 1. It is even possible to use two discrete pipes or tubes one of which is telescoped into the other, one of which is telescoped into the nipple 73, and the other of which is telescoped into or receives the upper end portion of the riser 20.

Figure 11:
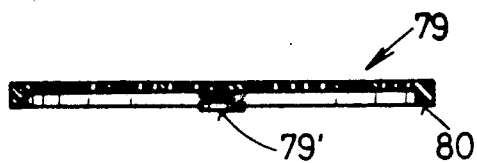
FIG. 11 is an axial sectional view of a foraminous distributing device for hot liquid which can be used with the filtering unit of the machine shown in FIG. 9 or 10.

The underside of the foraminous top wall 79 which is shown in FIGS. 9 and 11 has a centrally located handgrip portion in the form of a knob 79'. This knob can be used as a means for facilitating rotation of the top wall 79 in the space 54 if the maximum diameter of the top wall 79 is smaller than the diameter of the surface surrounding the space 54 for a supply of flavoring agent. The illustrated top wall 79 is dimensioned in such a way that it is incapable of entering the space 54. Therefore, the operator of the machine 10 of FIG. 9 must resort to a spoon or another tool in order to uniformly spread the flavoring agent within the upper section 72, or the operator must use the spreader 109 of FIG. 1 or an analogous substantially disc-shaped spreader with or without vanes or blades 113 and with or without a rim 112.

If the top wall 79 is dimensioned in a manner as shown in FIG. 9 so that its marginal portion 80 comes to rest on the upper end face of the upper section 72, and if the space 54 is not filled with flavoring agent, droplets or jets of hot water which is supplied by the channels 76 penetrate through the holes, bores or interstices of the top wall 79 to thereupon drip onto the supply of flavoring agent on the bottom wall 86 of the section 72. In other words, droplets of hot water which have penetrated through the top wall 79 must cover a relatively long distance on their way into contact with the supply of flavoring agent.

If the illustrated top wall 79 is replaced by or used jointly with a second top wall 179 which is indicated in FIG. 9 by phantom lines, the second top wall can be used as a means for spreading the flavoring agent in the space 54. When the spreading operation is completed, the top wall 179 is simply left to rest on the supply of filtering agent in the space 54 when the machine 10 of FIG. 9 is in actual use. Hot water which flows from the open upper ends 77 of the channels 76 onto the upper side of the top wall 179 in the space 54 (at a greater or lesser distance from the bottom wall of the upper section 72) then reaches the flavoring agent as soon as it has penetrated through the top wall 179. A knob 279 serves as a means for facilitating rotation of the top wall 179 in the space 54 in order to spread out and thus equalize the supply of flavoring agent prior to start of the brewing operation. Uniform distribution of flavoring agent in the space 54 is desirable and advantageous because this enhances the quality of the beverage by ensuring uniform contact between heated water and each and every portion of flavoring agent in the space 54.

FIGS. 12 and 13 show that the longer ribs 87 extend all the way to the sidewall which surrounds the space 54 in the upper section 72 of the filtering unit 70. Furthermore, the radially outermost portions of the additional ribs 88 also extend all the way to the just mentioned sidewall. This ensures that a paper filter or another filter (be it dispensable or a reusable filter) can be held away from the major portion of the upper side of the bottom wall 86 of the section 72 all the way from the center 108 to the sidewall around the space 54, i.e., that there is room for the flow of beverage along the bottom wall 86 (between the ribs 87 and 88) all the way from the sidewall to the openings 85. The diameter of the filter which is used in the section 72 preferably matches or closely approximates the diameter of the surface bounding the space 54; this reduces the likelihood of clogging of openings 85 with flavoring agent which would be free to escape among the periphery of a relatively small filter to advance along the upper side of the bottom wall 86 of the section 72 and toward and into the openings 85. The sloping surfaces 89 which flank the ribs 87 (such surfaces are or can also be provided adjacent the additional ribs 88) promote the flow of beverage along the bottom wall 86 of the section 72 toward and into the openings 85.

The feature that the outer wall of the housing 11 is integral with the partition 19, with the ribs of securing means 23 and with the riser 20 contributes to simplicity and lower cost of the machine, especially as concerns the initial cost of its parts and the cost of assembling the machine. Moreover, such design of the housing 11 contributes to sturdiness and stability of the entire machine.

It will be noted that the handle of FIG. 9 is different from the handle 12, 17 of the machine which is shown in FIG. 1. The entire handle of FIG. 9 can constitute an integral part of the outer cylinder of the housing 11. Of course, it is equally within the purview of the invention to use a separately produced handle which is thereupon permanently or detachably (e.g., in a manner as shown in FIG. 1 for the outer portion 17 of the handle) secured to the outer cylinder of the housing 11 of the machine which is shown in FIG. 9.

Figure 10:
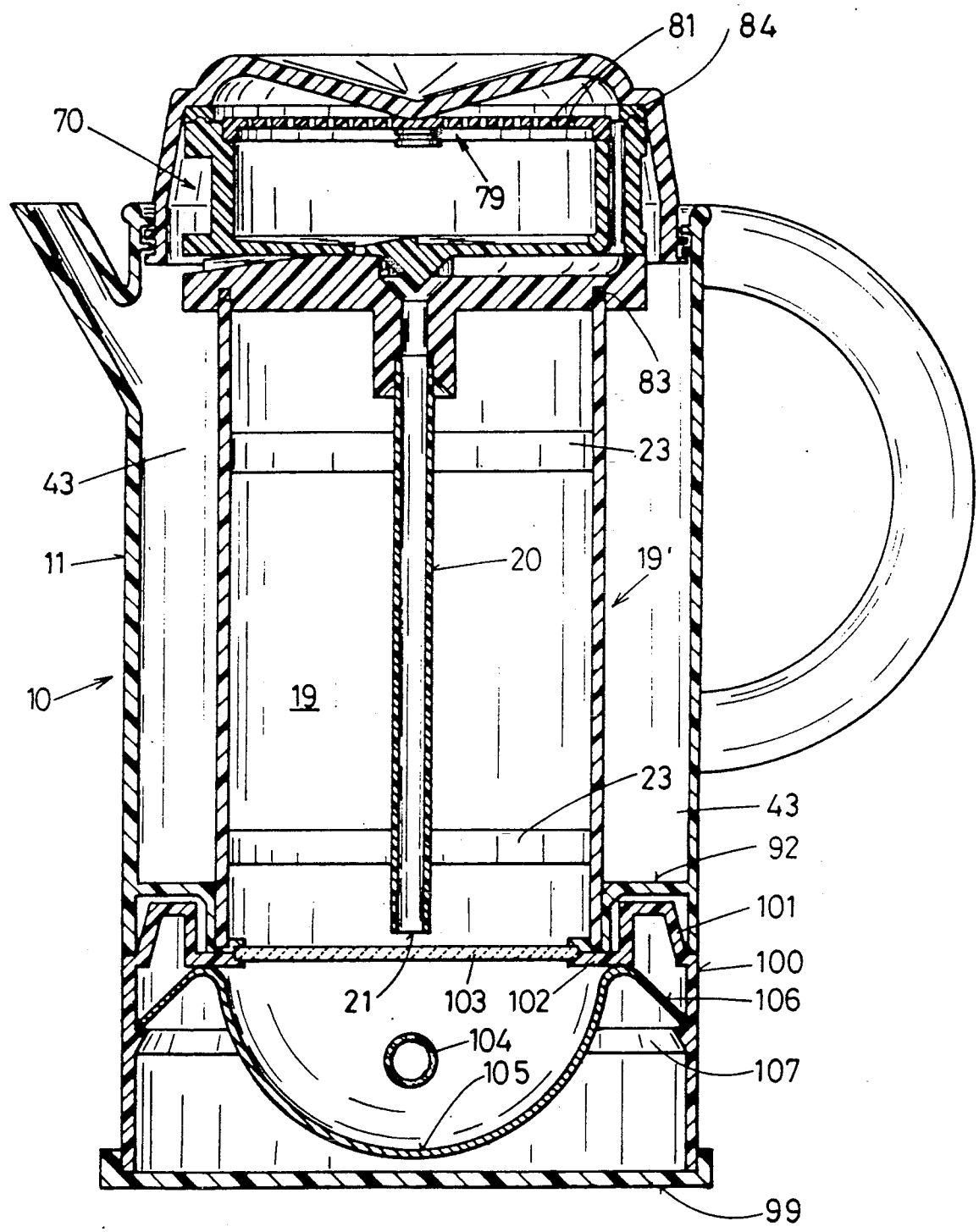
FIG. 10 is a similar central vertical sectional view of a third machine which employs the filtering unit of the second machine but utilizes a different heating element.

FIG. 10 shows a third machine 10 which constitutes a modification of the machine of FIG. 9 and employs a filtering unit 70 of the type shown in FIGS. 12 to 16. The partition 19' of the housing 11 in the machine 10 of FIG. 10 is a separately produced part which is integral with the two sets of ribs of securing means 23 for the riser 20. This partition 19' is disposed between the centrally located water chamber 19 and the annular coffee chamber 43 which latter surrounds and is sealed from the chamber 19. The lower end portion of the partition 19' rests on an annular sealing element (not specifically shown) which is or can be identical with the sealing element 83 between the upper end portion of the partition and the properly inserted filtering unit 70. The non-illustrated sealing element at the lower end of the partition 19' is supported by a radially inwardly extending washer-like innermost portion at the lower end of a cylindrical intermediate portion of the bottom wall 92 which is integral with the outer cylinder of the housing 11 and is located beneath the lower end of the coffee chamber 43.

The housing 11 of the machine 10 of FIG. 10 further comprises a separately produced hollow base 100 including an inwardly extending annular top flange 101 with a washer-like radially innermost portion 102 serving as a support for the radially innermost portion of the bottom wall 92 for the chamber 43. The bottom wall 92 cooperates with the flange 101 of the base 100 to hold the marginal portion of a horizontal panel 103, preferably a panel which is made of a ceramic material, such as "CERAN" (trademark), and serves to transmit heat from a heating element 104, 105 to the body of water in the chamber 19.

The heating element includes a halogen lamp 104 which is partially surrounded by a semicylindrical or hemispherical reflector 105 having outwardly and downwardly bent marginal portions 106 resting on an internal support or platform 107 of the hollow base 100 at a level above the detachable bottom wall 99. The halogen lamp 104 is located at the focus of the concave surface of the reflector 105.

The base 100 can accommodate two or more halogen lamps 104 each of which can be partially surrounded by a discrete reflector or all of which can be partially surrounded by a common reflector. The sockets for the end portions of the illustrated halogen lamp 104 and other parts of the electrical and electronic components of the machine 10 of FIG. 10 have been omitted for the sake of clarity. Reference may be had to commonly owned U.S. Pat. No. 4,835,367 granted May 30, 1989 to Hoffmann and showing a portable electric radiant fan heater with heating means including one or more halogen lamps. An electric steam iron with heating means including one or more halogen lamps is disclosed in commonly owned U.S. Pat. No. 4,835,363 granted May 30, 1989 to Hoffmann. The manner of mounting the halogen lamp 104 of FIG. 10 in the base 100 can be identical with or analogous to the manner of mounting halogen lamps in the patented appliances of Hoffmann.

When the circuit of the halogen lamp 104 is completed, some of the heat which is generated by the lamp impinges directly upon the panel 103 and is conveyed to the body of water in the chamber 19. The remaining heat is reflected by the upper surface of the reflector 105 and is also transmitted to the panel 103 to heat water in the chamber 19. The configuration of the reflector 105 can be the same if the heating means of the machine 10 shown in FIG. 10 comprises two or more halogen lamps 104.

The placing of halogen lamp 104 at the focus of the reflector 105 ensures that a high percentage of heat energy is used to heat water in the chamber 19. A panel (103) which is made of "CERAN" (trademark) not only transmits infrared light but can also store substantial amounts of heat energy.

The improved machine of susceptible of many additional modifications without departing from the spirit of the invention. For example, the external threads 37 of the housing 11 and the mating internal threads of the cover 36 can be replaced with other suitable means for sealingly but separably connecting the cover to the housing. Thus, the cover 36 can be provided with prong-shaped or otherwise configurated elastically deformable male detent elements for penetration into complementary female detent elements in the upper end portion of the housing and/or vice versa. It is also possible to replace the mating threads with a bayonet mount or with another suitable rapidly disengageable coupling.

The tube or pipe 48 of the machine 10 which is shown in FIG. 1 can be omitted if the length of the riser 20 is selected in a manner as shown in FIGS. 9 and 10, i.e., so that the upper end portion of the riser can extend all the way into the nipple 45.

The partition 19' can be configurated in such a way that it resembles a hollow conical frustum which tapers toward the filtering unit 38 or 70. Each securing means 23 of this partition can comprise two, three, five or more reinforcing ribs, and the number of securing means 23 can be reduced to one or increased to three or more.

The spreader 109 can be replaced with a simplified spreader which is devoid of vanes or blades 113 and/or marginal rim 112. Such spreader can be used to tamp as well as to distribute the flavoring agent around the nozzle 47 or in the space 54 within the upper section 72 of the filtering unit 70. A simplified combined liquid distributor and spreader 179 is shown in FIG. 9.

Still further, and as already pointed out hereinabove, the improved machine can be provided with two or even more heating elements or groups of heating elements. For example, the illustrated heating element 52, 93 or 104 can be used to perform the primary or major heating action. A smaller or weaker heating element can be turned on in automatic response to a rise of water temperature to a preselected value at which a smaller heat output suffices to cause the outflow of remaining heated water from the chamber 19 into the space 54 of the filtering unit 38 or 70. Such smaller or weaker second heating unit can be used to assist the main heating unit or as a heating unit which is turned on only when the brewing operation is completed, i.e., when the generation of additional heat merely serves to prevent excessive cooling of beverage in the chamber 43. Moreover, if the heating means comprises a primary heating element and a weaker secondary heating element (or a group of primary and a group of secondary heating elements), the primary and secondary heating elements can be used jointly to rapidly heat the body of water in the chamber 19, and the secondary element or elements are operated alone when the temperature of water in the chamber 19 is sufficiently high to ensure that adequate additional heating can be achieved with the secondary element or elements. The circuitry for operating two discrete heating elements or two discrete groups of heating elements in the just outlined manner is known from the art of machines for brewing coffee, tea and other hot beverages. Heating of the beverage in the chamber 43 can begin in automatic response to completed evacuation of water from the chamber 19.

Heating means which employs one or more thick film conductors can be used with particular advantage to furnish selected quantities of heat energy. The thick film conductor or conductors are of pasty consistency during application to the respective side of the panel 94. This panel can be provided with two or more groups of thick film conductors, and the controls of the machine then comprise means for selectively completing the circuit or circuits of one, two or more thick film conductors in order to generate requisite amounts of heat energy. Thus, the circuits of all groups can be completed when the heating of the body of water in the chamber 19 begins in order to ensure that the body of water is rapidly heated to a certain temperature. One of the groups can be disconnected from the energy source when the temperature of water is sufficiently high to ensure that a single group can generate enough heat to effect the expulsion of heated water or the expulsion of remaining hot water from the chamber 19 into the chamber 43 by way of the riser 20 and filtering unit 70. A third group of thick film conductors can remain in circuit with the energy source in order to maintain the temperature of the beverage in the chamber 43 at or above a selected minimum value. As mentioned above, thick film conductors are known, and so is the mode of applying thick film conductors to a support, either in the form of a single conductor, a single group of conductors or two or more groups of conductors. The making of necessary circuits to connect one or more thick film conductors with an energy source is also known in the art.

An important advantage of the improved machine is that it can serve as a means for brewing hot beverages as well as to store a freshly brewed beverage for any desired practical period of time without the need for a discrete coffee pot or an analogous vessel. Moreover, the machine has an eye-pleasing appearance and can complete the brewing operation within a fraction of the interval of time which would have been required by a conventional carafe-shaped machine to brew the same quantity of hot coffee or another beverage.

Still further, the improved machine can be used as a means for heating water or milk without any brewing. Thus, and referring to FIG. 1, the filtering unit 38 and the partition 19' can be removed to establish a large water-receiving chamber (19+43) above the insert 26. Such large chamber is filled with a liquid (e.g., water) and the liquid is heated while the cover 36 remains detached from or while the cover is attached to the top portion of the housing 11. The heating element 52 can heat the large supply of liquid in the housing 11 (upon removal of the partition 19') to any desired temperature, e.g., to a temperature which is needed to pour heated water over a supply of instant coffee in a cup or a like receptacle, to pour hot water into a cup prior to immersion of a tea bag, to make instant soup and/or for other purposes.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A machine for brewing hot beverages by contacting a flavoring agent with a heated liquid, particularly an automatic coffee or tea maker, comprising a substantially carafe-shaped hollow housing having at least one partition dividing the interior of the housing into a first chamber for a liquid and a second chamber for the beverage; a filtering unit disposed in said housing above said partition and having means for receiving a supply of flavoring agent; means for heating and thus pressurizing the liquid in said first chamber, said heating means including at least one thick film conductor; means for conveying heated and pressurized liquid from said first chamber into said unit, said unit having means for discharging the thus obtained beverage into said second chamber; and a cover for said unit, said housing and said cover comprising means for sealingly but separably connecting said cover to said housing with a force which suffices to resist the pressure of heated fluid in said first chamber.

2. The machine of claim 1, wherein said conveying means includes means for distributing heated and pressurized liquid in said receiving means.

3. The machine of claim 2, wherein said conveying means further comprises a riser arranged to convey heated and pressurized liquid from said first chamber to said distributing means.

4. The machine of claim 1, wherein said housing comprises a portion beneath said second chamber, said portion having a downward extension supporting said heating means.

5. The machine of claim 4, further comprising carrier means for said at least one conductor, said carrier means being mounted on said extension.

6. The machine of claim 1, wherein first chamber is open from below and said heating means includes a ceramic panel which seals said first chamber from below, said at least one conductor being located beneath said panel.

7. A machine for brewing hot beverages by contacting a flavoring agent with a heated liquid, particularly an automatic coffee or tea maker, comprising a substantially carafe-shaped hollow housing having at least one partition dividing the interior of the housing into a first chamber for liquid and a second chamber for the beverage; a filtering unit disposed in said housing above said partition and having means for receiving a supply of flavoring agent; means for heating and thus pressurizing the liquid in said first chamber; means for conveying heated and pressurized liquid from said first chamber into said unit, said unit having means for discharging the thus obtained beverage into said second chamber, said conveying means including means for distributing heated and pressurized liquid in said receiving means and a riser arranged to convey heated and pressurized liquid from said first chamber to said distributing means, said receiving means including a bottom wall having an opening which receives heated liquid from said riser and said distributing means comprising at least one nozzle which receives heated liquid from said opening; and a cover for said unit, said housing and said cover comprising means for sealingly but separably connecting said cover to said housing with a force which suffices to resist the pressure of heated liquid in said first chamber.

8. The machine of claim 7, wherein said riser has an upper end and said bottom wall has a downwardly extending nipple arranged to convey heated liquid from the upper end of said riser to said opening.

9. The machine of claim 7, wherein said nozzle includes a top wall above said opening and an annulus of webs connecting said top wall with said bottom wall around said opening, said nozzle further having apertures alternating with said webs and communicating with said opening.

10. The machine of claim 9, wherein said webs together form a hollow conical frustum which tapers in a direction from said bottom wall toward said top wall.

11. The machine of claim 10, wherein said webs are identical and the neighboring webs of said annulus are equidistant from each other, the mutual spacing of neighboring webs matching the width of a web in the circumferential direction of said annulus.

12. A machine for brewing hot beverages by contacting a flavoring agent with a heated liquid, particularly an automatic coffee or tea maker, comprising a substantially carafe-shaped hollow housing having at least one partition dividing the interior of the housing into a first chamber for liquid and a second chamber for the beverage; a filtering unit disposed in said housing above said partition and having means for receiving a supply of flavoring agent; means for heating and thus pressurizing the liquid in said first chamber; means for conveying heated and pressurized liquid from said first chamber into said unit, said unit having means for discharging the thus obtained beverage into said second chamber, said conveying means including means for distributing heated and pressurized liquid in said receiving means and said receiving means including a bottom wall and a sidewall above said bottom wall, said discharging means including windows in said sidewall and said unit further comprising a filter overlying said windows; and a cover for said unit, said housing and said cover comprising means for sealing but separably connecting said cover to said housing with a force which suffices to resist the pressure of heated liquid in said first chamber.

13. The machine of claim 12, wherein said filter is reusable.

14. The machine of claim 12, wherein said filter comprises a frame having windows and a screen overlying the windows in said frame.

15. The machine of claim 12, wherein said unit further comprises means for retaining said filter within said sidewall.

16. The machine of claim 15, wherein said retaining means includes a pair of spaced-apart rings and webs extending between said rings and alternating with windows for the flow of beverage from the supply of flavoring agent into the windows of said filter and said sidewall.

17. The machine of claim 16, wherein said bottom wall has a socket for one of said rings and the other of said rings is adjacent to and is surrounded by said sidewall.

18. The machine of claim 17, wherein said other ring is disposed at a level above said one ring and the windows of said sidewall are disposed at a level between said socket and said other ring.

19. The machine of claim 18, wherein said sidewall has an internal shoulder adjacent said other ring.

20. The machine of claim 15, wherein said retaining means is bonded to said sidewall.

21. A machine for brewing hot beverages by contacting a flavoring agent with a heated liquid, particularly an automatic coffee or tea maker, comprising a substantially carafe-shaped hollow housing having at least one partition dividing the interior of the housing into a first chamber for liquid and a second chamber for the beverage; a filtering unit disposed in said housing above said partition and having means for receiving a supply of flavoring agent; means for heating and thus pressurizing the liquid in said first chamber; means for conveying heated and pressurized liquid from said first chamber into said unit, said unit having means for discharging the thus obtained beverage into said second chamber, said conveying means including means for distributing heated and pressurized liquid in said receiving means and said unit comprising an upper section and a lower section, said upper section including said receiving means and said distributing means including a foraminous top wall for said upper section, said conveying means including channels provided in said sections to supply heated liquid onto said top wall; and a cover for said unit, said housing and said cover comprising means for sealingly but separably connecting said cover to said housing with a force which suffices to resist the pressure of heated liquid in said first chamber.

22. The machine of claim 21, wherein said upper section has a bottom wall and said discharging means including openings in said bottom wall.

23. The machine of claim 22, wherein said unit further comprises a filter provided in said upper section above said bottom wall to support the supply of flavoring agent beneath said foraminous top wall.

24. The machine of claim 13, wherein the filter on said bottom wall is an expendable filter, particularly a paper filter.

25. The machine of claim 22, wherein said discharging means further comprises an outlet provided between said sections and establishing a path for the flow of beverage from said openings into said second chamber.

26. The machine of claim 22, wherein said conveying means further comprises a riser provided in said first chamber and having open upper and lower ends, and a nipple extending downwardly from said lower section to deliver heated liquid from the upper end of said riser to said channels.

27. The machine of claim 26, wherein said nipple has a hole including an enlarged upper portion in communication with the channels of said lower section.

28. The machine of claim 27, wherein the channels of said lower section extend substantially radially outwardly from said enlarged portion, the channels of said upper section extending upwardly from the channels of said lower section and having discharge ends for admission of heated liquid onto said foraminous top wall.

29. The machine of claim 27, wherein said upper section has a substantially conical liquid spreading element extending with clearance into the enlarged portion of said hole.

30. The machine of claim 27, wherein at least the upper section of said unit has a substantially circular outline and the enlarged portion of said hole is located at the center of said upper section, the channels of said lower section extending substantially radially outwardly from said enlarged portion and having outer ends remote from said center, the channels of said upper section being substantially vertical and having lower ends communicating with the outer ends of channels in said lower section, the channels of said upper section being equidistant from said center.

31. The machine of claim 30, wherein the openings in the bottom wall of said upper section are substantially equidistant from said center.

32. The machine of claim 31, wherein the distance of channels in said upper section from said center is a multiple of the distance of said openings from said center.

33. The machine of claim 30, wherein said bottom wall has an upper side provided with ribs extending substantially radially outwardly from the center of said upper section toward and close to the channels of said upper section.

34. The machine of claim 33, wherein the upper side of said bottom wall has additional ribs alternating with said radially outwardly extending ribs and extending radially inwardly toward but short of said center.

35. The machine of claim 34, wherein said openings alternate with said radially outwardly extending ribs and said additional ribs are disposed radially outwardly of the respective openings.

36. The machine of claim 33, wherein said upper side includes pairs of sloping surfaces flanking said ribs.

37. The machine of claim 21, wherein said second section has an annular upper end and said foraminous top wall has an annular marginal portion abutting the upper end of said upper section.

38. A machine for brewing hot beverages by contacting a flavoring agent with a heated liquid, particularly an automatic coffee or tea maker, comprising a substantially carafe-shaped hollow housing having at least one partition dividing the interior of the housing into a first chamber for liquid and a second chamber for the beverage; a filtering unit disposed in said housing above said partition and having means for receiving a supply of flavoring agent; means for heating and thus pressurizing the liquid in said chamber; means for conveying heated and pressurized liquid from said first chamber into said unit, said unit having means for discharging the thus obtained beverage into said second chamber, said conveying means including means for distributing heated and pressurized liquid in said receiving means and said conveying means including a riser disposed in said first chamber; means for integrally securing said riser to said housing, said partition being integral with said securing means and said unit being disposed on top of said first chamber; and a cover for said unit, said housing and said cover comprising means for sealingly but separably connecting said cover to said housing with a force which suffices to resist the pressure of heated liquid in said first chamber, said cover overlying said unit.

39. The machine of claim 38, wherein said housing has a compartment beneath said first chamber and said heating means is disposed in said compartment.

40. The machine of claim 39, wherein said housing further comprises a detachable bottom wall beneath said compartment.

41. A machine for brewing hot beverages by contacting a flavoring agent with a heated liquid, particularly an automatic coffee or tea maker, comprising a substantially carafe-shaped hollow housing having at least one partition dividing the interior of the housing into a first chamber for liquid and a second chamber for the beverage; a filtering unit disposed in said housing above said partition and having means for receiving a supply of flavoring agent; means for heating and thus pressurizing the liquid in said first chamber; means for conveying heated and pressurized liquid from said first chamber into said unit, said unit having means for discharging the thus obtained beverage into said second chamber, said conveying means including means for distributing heated and pressurized liquid in said receiving means and said distributing means comprising a foraminous top wall arranged to rest directly on top of the supply of flavoring agent in said unit; and a cover for said unit, said housing and said cover comprising means for sealingly but separably connecting said cover to said housing with a force which suffices to resist the pressure of heated liquid in said first chamber.

42. A machine for brewing hot beverages by contacting a flavoring agent with a heated liquid, particularly an automatic coffee or tea maker, comprising a substantially carafe-shaped hollow housing having at last one partition dividing the interior of the housing into a first chamber for liquid and a second chamber for the beverage, said housing further having a hollow base beneath said chambers; a filtering unit disposed in said housing above said partition and having means for receiving a supply of flavoring agent; means for heating and thus pressurizing the liquid in said chamber, including at least one halogen lamp in said base; means for conveying heated and pressurized liquid from said first chamber into said unit, said unit having means for discharging the thus obtained beverage into said second chamber and said conveying means including means for distributing heated and pressurized liquid in said receiving means; and a cover for said unit, said housing and said cover comprising means for sealingly but separably connecting said cover to said housing with a force which suffices to resist the pressure of heated liquid in said first chamber.

43. The machine of claim 42, wherein said base includes an annular internal flange beneath said second chamber, said flange defining an opening beneath said first chamber and said at least one lamp being disposed beneath said opening.

44. The machine of claim 42, wherein said heating means further includes at least one reflector for said at least one lamp, said reflector having a concave surface partially surrounding said lamp and said lamp being located at the focus of said surface.

45. The machine of claim 44, wherein said reflector has an outwardly extending marginal portion and said base has an internal support means for said marginal portion.

* * * * *